United States Patent [19]
Serret

[11] 3,851,975
[45] Dec. 3, 1974

[54] OPTICAL METHOD AND APPARATUS FOR DETECTION OF DEFECTS

[75] Inventor: Gerard Serret, Paris, France

[73] Assignee: Saint-Gobain Industries

[22] Filed: Oct. 8, 1969

[21] Appl. No.: 864,624

[30] Foreign Application Priority Data
Oct. 9, 1968    France ............................ 68.169187

[52] U.S. Cl. .............. 356/198, 356/240, 250/223 B
[51] Int. Cl. ........................................... G01n 21/32
[58] Field of Search ......... 250/223 B; 356/240, 198, 356/95, 223 B

[56] References Cited
UNITED STATES PATENTS

| | | | |
|---|---|---|---|
| 2,847,899 | 8/1958 | Walsh | 356/95 |
| 3,081,666 | 3/1963 | Calhoun et al. | 356/240 |
| 3,505,526 | 4/1970 | Sendt | 356/240 |

Primary Examiner—Ronald L. Wibert
Attorney, Agent, or Firm—Pennie & Edmonds

[57] ABSTRACT

Method and apparatus for detecting defects optically by subjecting objects to a beam of light transmitted by glass fibers and receiving and analyzing the beam as reflected by the objects. The invention may advantageously be applied to the examination of transparent objects such as glass bottles. In accordance with the invention the beam of incident light is modulated with a known frequency before it impinges on the objects, the reflected beam being received upon a photoelectric cell the output of which is connected to an amplifier of the band pass type sensitive to the frequency of modulation of the light. The invention eliminates the necessity for complete housing of the transmitter-receiver, and facilitates the distinguishing of meaningful signals from "noise" from extraneous sources, not withstanding the use of optical fibers.

4 Claims, 2 Drawing Figures

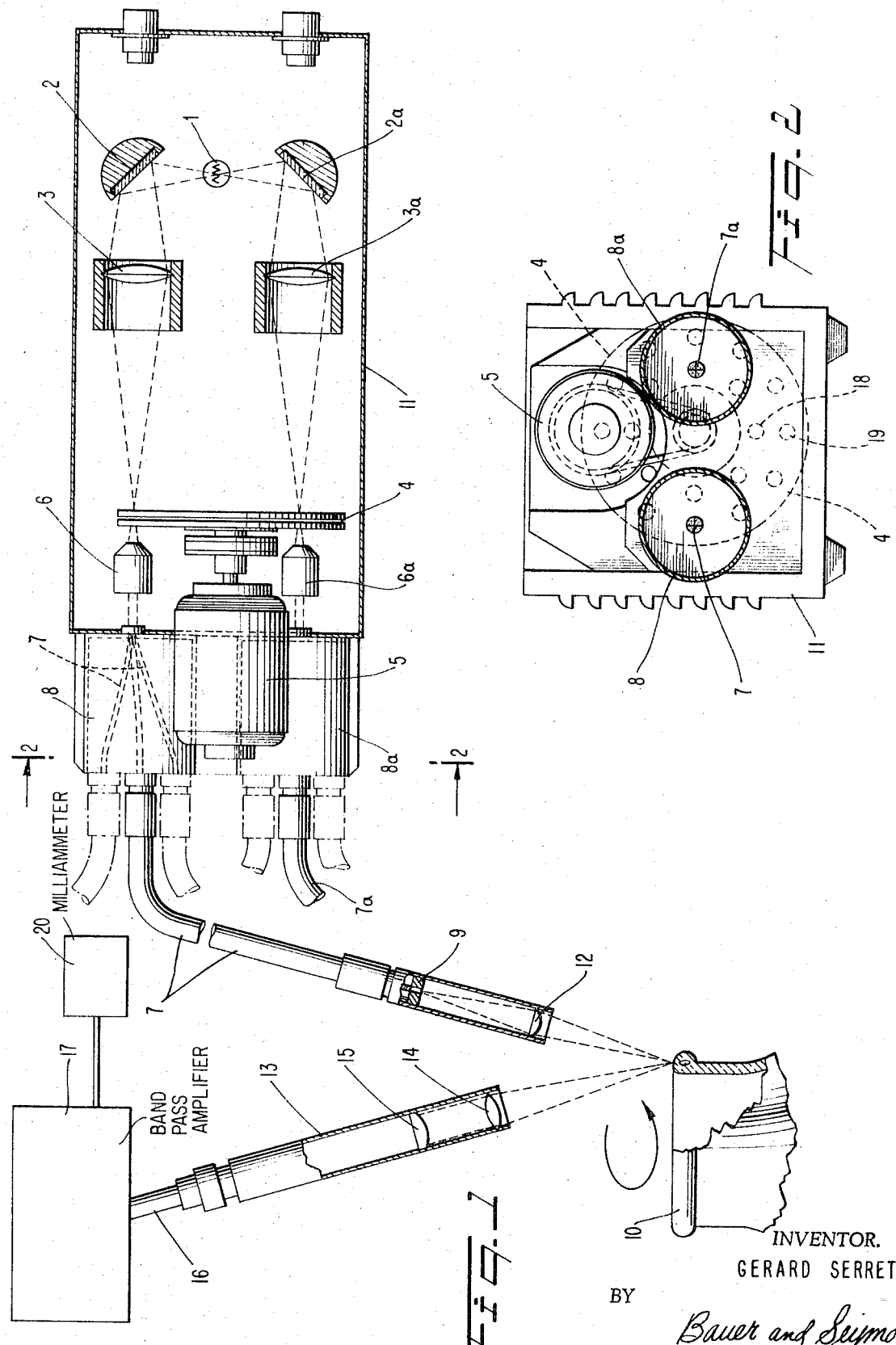

OPTICAL METHOD AND APPARATUS FOR DETECTION OF DEFECTS

This invention relates to a method of and an apparatus for detecting defects optically in an apparatus employing glass fibers for transmission of the ray, for example for the examination of the surface or glaze of transparent objects such as glass bottles so that defective bottles may be discarded. It is known to cause bottles to travel in a line in front of a light source which illuminates them successively around their entire periphery by reason of a relative rotational movement between the bottles and the light source. One such apparatus includes a receiving head having a photoelectric cell having its output connected to an amplifier, the head being disposed in a convenient position and detecting deviations in the intensity of the light which it receives by reason of the presence of defects in the bottles.

Because of the nature of the defects which are sought, the luminosity of the signal received by the photocell is generally very weak and is also very variable as well. It is thus advantageous to be able to distinguish with certainty those signals which lie near the level of the received "noise" which are caused by variations in the bottles from signals which originate externally of the bottles, as for example by variations in the ambiant luminosity of the light source. This is why it is necessary in the known detecting systems to enclose the detecting assemblies of the apparatus as completely as possible within a housing.

Another difficulty occurs because it is sought, on the other hand, to reduce the bulk of the light emitting and receiving heads in order to examine very small bottles. For this purpose there have been employed emitters using optical fibers. Such emitters have the advantage of possessing a small readily movable head which makes it flexible in its use, but they have the inconvenience of transmitting a very weak light, caused principally by the dispersion of the luminous rays as they leave the fibers, a fact which renders the receiver particularly vulnerable to noise at the lower signal levels. Under such conditions, the nicety of regulation necessary deprives the apparatus of a large part of its theoretical advantage.

It is also sought to group many of the controls at the same control position, but such a grouping requires a minute study of the geometry of the apparatus in order to minimize reciprocal parasitic effects without, however, eliminating them totally at the expense of making the apparatus useful for examining only objects of one given kind.

The invention has for its object a provision of a novel method and an apparatus which for the most part eliminate the above-outlined disadvantages of prior art methods and apparatuses.

In accordance with the invention there is employed a source of light modulated to a convenient frequency with a receiver comprising a photoelectric cell having small inertia and high sensitivity like those used in solar generators for satellites, the output of the cell being connected to a band amplifier passing a narrow band of frequencies corresponding to the frequency of modulation of the light source. The insensibility of the apparatus to parasitic "noises" permits the amplification to be increased sufficiently to free the optical fibers from their disadvantages; the use of optical fibers permits the apparatus to be readily adjustable. When optical fibers are used, it is possible by use of the invention to simplify the feeding of the bundles of fibers with light and to energize a plurality of emitters from a single luminous source. As a result, the flexibility of use of the apparatus is very considerably increased.

Such modulation of the light source permits the entire elimination of any housing about the apparatus in the portion thereof wherein the bottles are examined. The best practice, however, will entail protection of the apparatus from parasitic secondary modulation; thus, the luminous beam should be sufficiently isolated by being protected by a housing which is positioned close to the source of light.

In accordance with another characteristic of the invention, there is employed at the same control position a plurality of combined emitter-receivers having different characteristic frequencies; this permits the use of movable emitters fed by flexible optical fibers in order to multiply the operations carried out at such control station without danger that the various devices will interfere with each other to give rise to a parasitic signal, and as a consequence does not complicate the use of the apparatus. Such apparatus may be employed for a large number of different uses. One such apparatus in accordance with the invention includes a housing in the interior of which there is provided a source of light, an optical system, a modulator, a bundle of flexible optical fibers transmitting each modulated light ray from the emitter, and a receiver provided with a connected amplifier.

The modulator may also be a rotatable disc provided with orifices disposed concentrically of its axis. Such orifices may be openings of various shape, such as slits, holes and the like. The modulator may also include a movable band carrying orifices or windows, an apertured tuning fork, etc.

To increase the effectiveness of the light it is preferred that the source of light shall include means such as a lens system focussing the light in the plane of the means for modulating the light.

The modulating means, such as a disc, may be provided with a plurality of equally angularly spaced orifices or windows arranged in concentric rings, the orifices being different in number from ring to ring thereof, the modulated rays of light thus produced being transmitted by the bundles of optical fibers, which may have a length of as much as a meter or more, to the emitters serving to make different examinations of the bottles.

Other characteristics and advantages of the invention will appear in the following description of a preferred form thereof which is given by way of example and not by way of limitation.

In such description, reference is made to the following drawings:

FIG. 1 is a schematic view of the assembly of the units of the apparatus; and

FIG. 2 is a view in transverse section through the apparatus, the section being taken generally along line 2—2 of FIG. 1.

In the apparatus shown in the drawings there is a light source in the form of a lamp 1, which may be, for example, an iodine lamp, two mirrors 2–2a disposed at opposite 45° angles to the optical axis, and two lens systems 3–3a each of which forms an image of the filament of the lamp in the plane of the disc 4. Such disc, driven by motor 5, carries two series of equally angularly spaced orifices or windows which are disposed in rings concentric of the axis of the disc, one of such series of orifices modulating the luminous rays provided by the lens system 3 and the other series to modulate the luminous rays provided by the lens system 3a. Such two series of orifices are different in number so as to obtain two luminous rays having different frequencies of modulation.

After modulation the two luminous rays enter the respective objectives 6–6a and emerge from the objectives into the various respective bundles of optical fibers 7–7a. In the example shown, such optical fibers are disposed in four bundles or cables 7–7a for each of the objectives 6–6a. The optical fiber bundles pass through distributors 8–8a as shown in FIG. 2. In the schematic assembly drawing of FIG. 1, only one fiber bundle is shown, such bundle feeding an emitter 9. When four fiber bundles each feeding its emitter 9 are employed, four bottles 10 each disposed at its respective examination station may be examined simultaneously. The emitters corresponding to the two light rays permit the simultaneous examination of the same bottle for defects of different kinds.

The assembly of the lamp 1, the mirrors 2, the objectives 3–3a and 6–6a, and the modulated disc 4 is enclosed in a housing 11. The emitters such as those shown in 9, include an optical lens system 12 permitting the luminous ray to be focused on the bottle and provided a beam projecting means which is easily adjusted.

Light reflected by the bottle passes into a receiver 13 carrying a lens system 14 and a photoelectric cell 15, such cell having a small inertia and a high sensitivity. Such cell may advantageously be a barrier layer solar cell as above-mentioned. Such cell feeds a band amplifier 17 which passes only the frequency imposed on the beam by the modulator 4, the cell being connected to the amplifier through a cable 16.

In spite of the use of optical fibers which tend to diminish the sensitivity of the apparatus, the high sensitivity of the receiver permits the apparatus to be of very small dimensions, while permitting weak signals to be detected; the apparatus thus requires no special controlling mechanism.

The output of the amplifier is connected to defect detecting and or measuring means 20, not shown in detail, which may be in the form of a milliammeter.

In the embodiment of the invention shown, the apparatus includes two emitter-receiver combinations 6–7 and 6a–7a of different characteristic frequencies. The frequencies of the two luminous rays are advantageously in a ratio to each other of from about 1/1.5 to 1/1.7, one frequency being for instance 5000 Hz. and the other being 7500 Hz.

In cases in which the apparatus includes three emitter-receiver combinations, the relationship of the frequency of the third ray to that of the first ray may be, for example, 1/2.5, that is to say, 12,500 Hz. when the first frequency of the ray is 5000 Hz. and the frequency of the second ray is 7500 Hz.

What is claimed is:

1. A method of examining a transparent object which comprises projecting onto the object at a single examining station by separate elongated vitreous light conducting means a plurality of focused modulated light beams having different modulated frequencies; transforming into separate modulated electrical signals of different modulated frequencies, by means of separate photoelectric cells, modulated light coming from the object and from said separate beams; amplifying said separate electrical signals in separate amplifiers passing only the frequencies of modulation of those signals respectively; and delivering the amplified modulated signals to separate detectors of signal deviations.

2. A method according to claim 1 in which there are simultaneously employed a first and a second light beam, the first and second light beams being modulated, respectively, at frequencies having a ratio with respect to each other of from about 1/1.5 to about 1/1.7.

3. A method according to claim 2, wherein the first and second light beams are provided by a single light source and two modulating means.

4. A method according to claim 2 in which there is a third light beam, the third light beam being modulated at a frequency with respect to the first light beam at a ratio of about 1/2.5.

* * * * *